Figure 3:
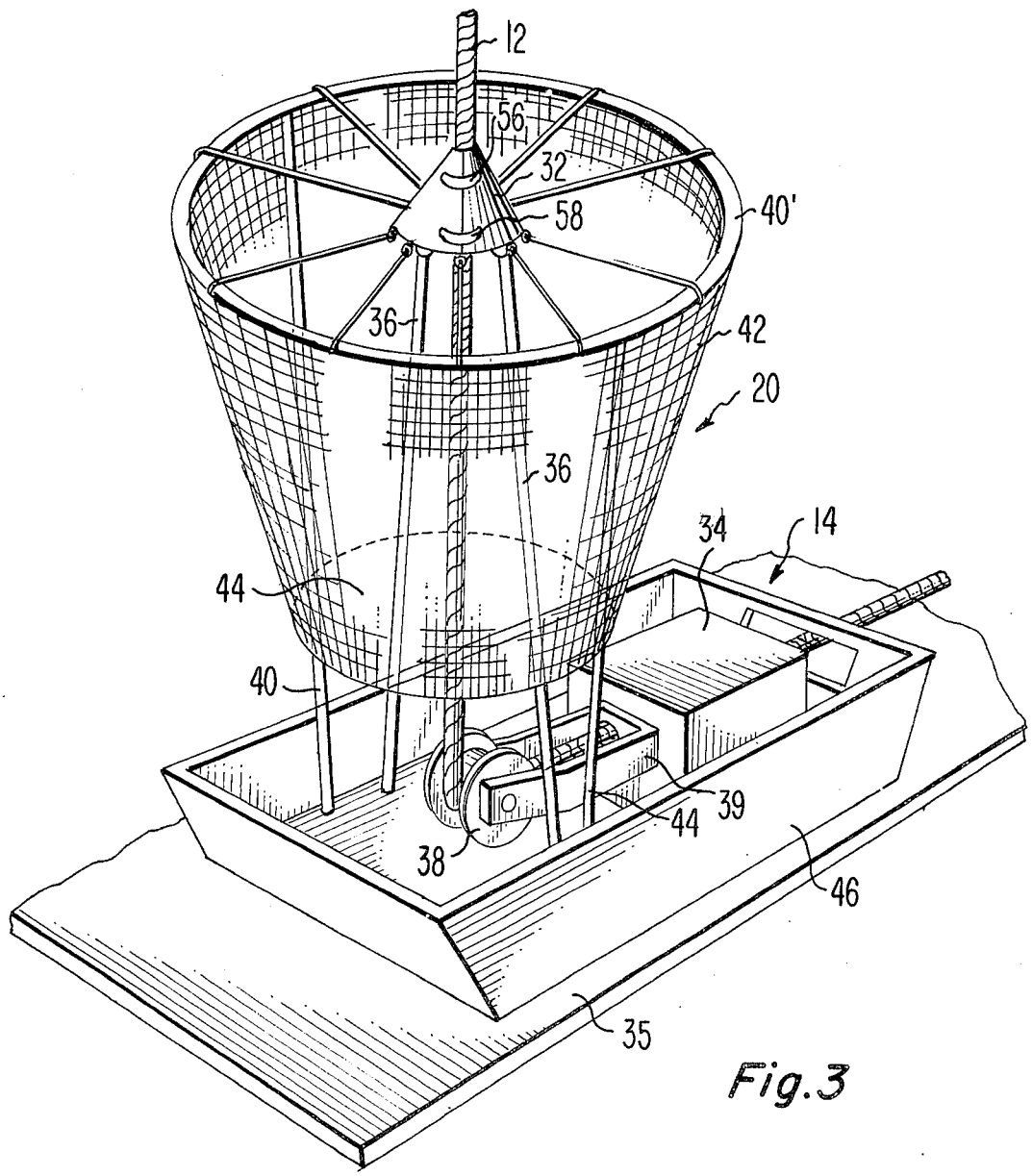

United States Patent [19]

Randolph

[11] 4,126,850
[45] Nov. 21, 1978

[54] AUTOMATIC RELEASE MECHANISM FOR A TETHER

[75] Inventor: Julie K. Randolph, Antigua Island

[73] Assignee: RCA Corporation, New York, N.Y.

[21] Appl. No.: 813,859

[22] Filed: Jul. 8, 1977

[51] Int. Cl.² .............................................. G08G 5/00
[52] U.S. Cl. .................................... 340/28; 104/211; 104/212; 244/33; 244/114 R; 362/391
[58] Field of Search ................ 244/155 R, 33, 114 R, 244/30, 137 R; 212/71, 81, 72, 74, 76, 78, 82, 83, 84, 85, 98, 99, 116, 117; 104/22, 23 R, 23 FS, 204, 112, 207, 113, 211, 212, 209, 210, 173 ST; 61/107, 112; 214/707; 362/226, 396, 391, 62; 24/114.5, 132; 254/135 R; 40/214, 216; 340/26, 28; 211/119.11; 29/819, 426, 433; 174/61

[56] References Cited

U.S. PATENT DOCUMENTS

| | | | |
|---|---|---|---|
| 292,317 | 1/1884 | Joseph | 40/214 |
| 1,249,455 | 12/1917 | Myers | 104/209 |
| 1,994,535 | 3/1935 | Roth | 244/33 |
| 3,531,066 | 3/1969 | Baekken | 244/137 A |
| 3,689,974 | 9/1972 | Whipple et al. | 29/819 |
| 4,055,316 | 10/1977 | Chipper et al. | 212/71 |

FOREIGN PATENT DOCUMENTS 49,614 11/1888 Fed. Rep. of Germany ........... 104/212

Primary Examiner—Galen L. Barefoot
Attorney, Agent, or Firm—H. Christoffersen; Samuel Cohen; William Squire

[57] ABSTRACT

Warning lights are releasably secured, by means of clamps, along the length of a cable employed as a tether for a balloon. The cable passes through a relatively stationary, conically shaped cam at the base of the cable. As the balloon is winched back to earth, a cam follower on each clamp is forced into engagement with the cam, causing the jaws of the clamp to open and the clamp and its indicator automatically to be released from the cable.

7 Claims, 6 Drawing Figures

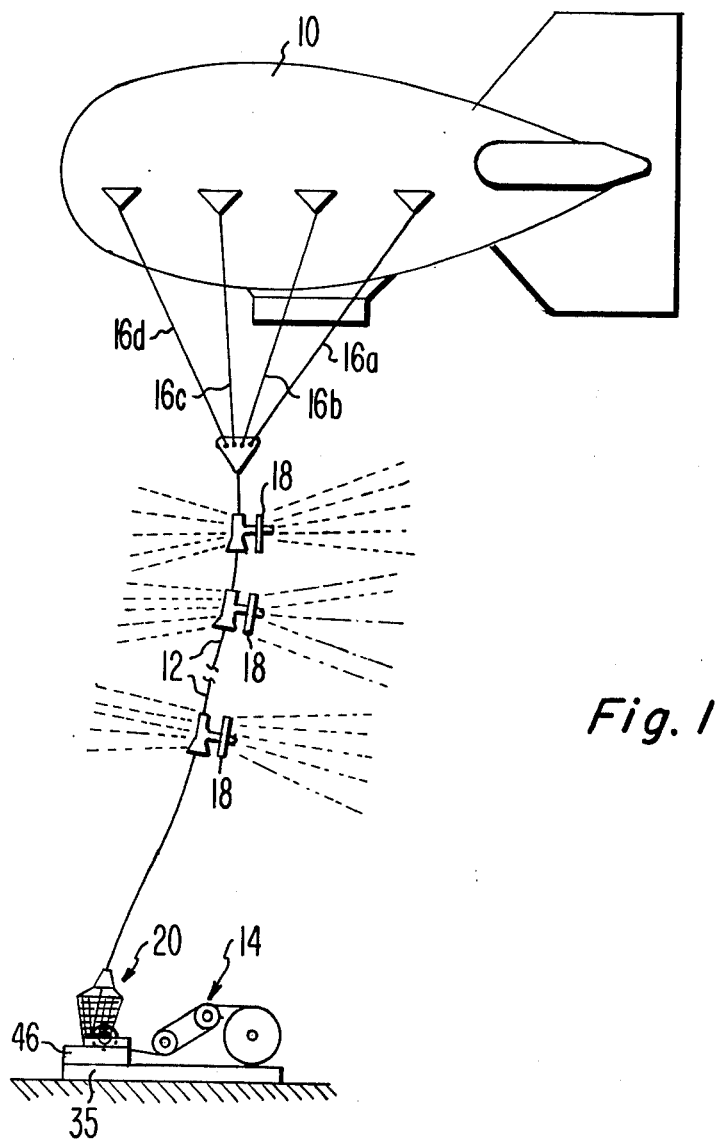
Fig. 1
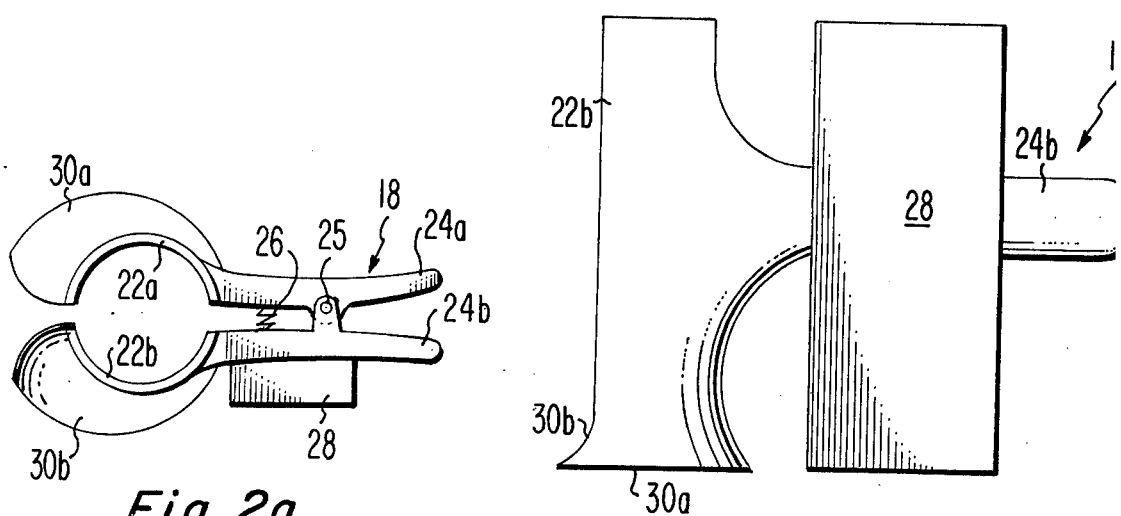
Fig. 2a
Fig. 2b

AUTOMATIC RELEASE MECHANISM FOR A TETHER

The present invention relates to an automatic release mechanism, one particularly suitable for releasing warning indicators from a tether for a balloon during the return of the balloon to earth.

It is known in the art to attach warning indicators such as lights to a balloon tether for warning flying aircraft of the presence of the tether. It is desired, in the interest of safety, that these lights be spaced relatively close to one another (say at 50 foot intervals) and if, as in the prior art, they are manually engaged and disengaged from the tether, this presents no problem. However, in the present state of the art, winches are employed which can return the balloon toward earth at relatively high speed, so high that it becomes difficult if not impossible to remove the lights by hand if they are as closely spaced as required for safety. So, the operator is faced with the dilemma of either increasing the spacing between lights, which is undesired, or operating the winch at lower speed, which is inefficient.

In a system embodying the invention, the clamp means securing each warning indicator to the tether includes a cam follower. A relatively stationary cam positioned to be engaged by the cam followers is located at the base of the tether. As the balloon is returned to earth, the tether drives the cam followers of the successive clamp means into engagement with the cam causing the jaws of the successive clamp means to open, and each clamp means (and its warning indicator) to be released.

Figure 4:
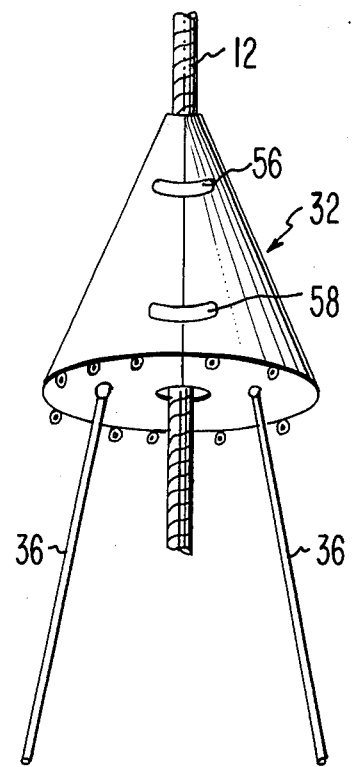
Figure 5:
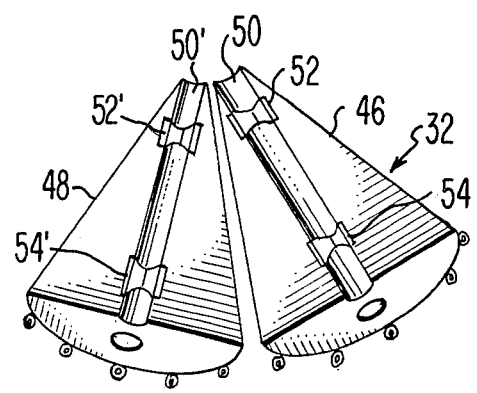

In the drawing:

FIG. 1 is a schematic elevational view of a balloon tether warning system embodying the present invention, FIGS. 2a and 2b are respectively plan and elevational views of a clamping device for securing a warning indicator to the tether cable of the system of FIG. 1, FIG. 3 illustrates a cam and associated clamp and indicator receiving arrangement for releasing and receiving the clamp and indicator assembly of FIGS. 2a and 2b from the cable when the cable is winched, and FIGS. 4 and 5 show further details of the cam used to release the clamp and indicator assembly from the cable.

In FIG. 1 the aeroform balloon 10 operated at altitudes of upwards to 10,000 feet above the earth is tethered by cable 12 which is secured at one end by winch apparatus 14 and at the other end to the balloon 10 via securing cables 16a–d. As used herein, the term cable is intended to be generic to all forms of lines, ropes, chains, or the like formed of any kind of material, natural or synthetic, metallic or non-metallic. Secured to cable 12 are a plurality of cable clamp and warning indicator assemblies 18. While only a few assemblies 18 are illustrated, it is to be understood that many more may be present on a given cable. For example, they may be spaced at 50 or 100 foot intervals along the cable. The purpose of the indicator assemblies 18 is to warn approaching aircraft of the presence of the cable 12. The indicator assemblies 18 may include, for example, high intensity warning blinkers as are now used on aircraft. Located adjacent the winch assembly 14 is a clamp and indicator assembly release mechanism 20.

The clamp and indicator assembly 18 is shown in more detail in FIGS. 2a and 2b wherein the clamp portion comprises first and second cylindrical cable clamping jaws 22a and 22b. The jaws 22a and 22b are circular for grasping the cable 12 which is also circular in section. Where the cable is of a different configuration, the jaws may be modified accordingly. Integral with jaws 22a and 22b are respective handles 24a and 24b. Handle 24a is pivoted with respect to handle 24b at pivot 25. A spring 26 resiliently urges the jaws 22a and 22b in a closed cable clamping position. A high intensity battery operated warning indicator 28 is mounted on handle 24b. Indicator 28 is conventional. Disposed at an end of the jaws 22a and 22b are funnel-shaped cam followers 30a and 30b depending from jaws 22a and 22b, respectively. The clamp and indicator assembly 18 is secured to the cable 12 manually by opening the jaws 22a and 22b, placing the jaws over the cable, then releasing the clamp, whereby the spring 26 causes the jaws to engage the cable 12. The jaws 22a and 22b preferably have an inner cable clamping surface of a suitable high friction material such as rubber or may be serrated metal or the like for providing high grasping friction to the cable 12. When in place on the cable 12, cam followers 30a and 30b point towards the earth and the winch assembly 14.

In FIG. 3 the release mechanism 20 includes a conical cam 32 which is supported in relatively fixed position by various struts 36. The cable 12 passes axially through the cam 32 via a central opening at the apex of the cone, this apex facing the balloon. In operation, as the cable is being winched back to earth, cam followers 30a and 30b of the assemblies positioned along the cable, successively are drawn into engagement with the cam 32. The cam causes the jaws 22a and 22b of each assembly to separate sufficiently that they release their grip on the cable, and the assembly thereupon drops off the cable and into the netting 42.

The winch assembly 14 includes a housing 34 mounted on a base 35 which for example, may be the bed of a truck. The winch assembly 14 also includes a flying sheeve 38 which is secured in a floating relationship with respect to housing 34 via yoke 39 rotatably mounted to housing 34. The cable 12 is threaded to the sheeve 38 and then through yoke 39, housing 34 and into the remainder of the winch assembly 14 for operation by the assembly 14 drive motor (not shown). The winch assembly 14 plays out the cable 12 when the balloon 10 is launched and retracts the cable 12 when the balloon 10 is returned to earth. The winch assembly retracts cable 12 at a relatively high rate, for example, 200 feet per minute, which is too high for manually disengaging assembly 10 from cable 12.

Mounted to the base 35 with ball joints (not shown) is a conical framework 40' via struts 40. In the alternative struts 40 may be mounted to yoke 39 without ball joints. This permits the framework 40' to pivot with cable 12 as yoke 39 rotates. Framework 40' secures netting 42 in a conical funnel configuration about passive cam 32. Cam 32 is secured to bed 35 with struts 36 which may be metal tubing pivotally mounted with ball joints (not shown) to bed 35. In the alternative, struts 37 may be mounted to yoke 39. This permits cam 32 to float with cable 12 as cable 12 pivots with sheeve 38. The struts 36 secure cam 32 in a relatively fixed position with respect to the cable 12 as the cable traverses through cam 32. Cam 32 is passive in that it performs its cam function with a relatively stationary cam element (relative to jaw 22a and 22b). The upper larger section of framework 40 is tied with cord to eyelets in the lower end of the cam 32. The netting funnel is open at both ends and terminates in an aperture 44 at the lower smaller end. Struts 40 are pivotally mounted to the framework 40' to bed 35 via ball joints or yoke 39 so that framework 40' floats with cam 32. Directly beneath aperture 44 is disposed indicator assembly 18 receptacle 46 mounted on base 35 for receiving the clamp and indicator assemblies 18 after they are released by the cam 32 received by netting 42, and fall through opening 44 when the cable 12 is retracted. Receptacle 46 is a box-like structure. While a netting 42 is illustrated, any other soft pliable fabric or material is also useful for harmlessly receiving ejected assemblies 18. The sheeve 38 and yoke 49 preferably is covered with a netting (not shown) or other protection means to further protect the assemblies 18 as they are released and also to protect sheeve 38 and yoke 39.

The cam 32, FIGS. 4 and 5, comprises a preferably solid member made of a suitable material formed of two halves 46 and 48 which are mirror images of each other. Each half 46 and 48 is formed with a groove 50 and 50', respectively along the central axis thereof. Disposed axially along the grooves 50 and 50' are a plurality of rollers 52 and 54 disposed in member 46 and rollers 52' and 54' disposed in member 48. The two halves 46 and 48 are disposed about the cable 12 and latched together by two pairs of identical latches 56 and 58 on opposite sides of cam 32 with the cable 12 riding between the corresponding pairs of rollers 52, 54 and 52' and 54'. Thus, the cable riding on rollers 52, 52', 54 and 54' when played out or retracted is free to translate in grooves 50 and 50' within cam 32 which is axially restrained by struts 36.

In operation, when a balloon 10 is sent aloft the winch assembly 14 plays out the cable 12 and, as the cable 12 goes aloft with the balloon, an operator manually opens the jaws 22a and 22b via handles 24a and 24b and attaches the clamp and indicator assembly 18 to the cable with the funnel-shaped cam followers 30a and 30b facing downward. Indicator assemblies 18 are assembled to the cable 12 at a given desired interval, e.g., 50 foot intervals. As the balloon sails, the cable 12 tends to shift position. The framework 40 and the cam 32 float with the cable 12 following its position via the ball joints (not shown) mounting struts 36 and framework 40 to base 35 or the mounting of the struts 36 and 40 to yoke 39. When the balloon is returned to earth from service, the winch assembly 14 winds the cable 12 at high rates as discussed above. The high velocity of the cable 12 passing through the cam 32 causes the clamp jaws 22a and 22b to separate and release the assemblies 18 into the netting 42. The soft netting harmlessly receives the indicator assemblies by cushioning the impact and permits them to fall by gravity into the receptacle 46 where they can be manually recovered.

What is claimed is:

1. Apparatus for automatically disengaging an aerial warning indicator secured to a cable during the retraction of said cable comprising:
   passive cam means secured adjacent the earth in a relatively fixed spaced position with respect to said cable,
   clamp means including said indicator and clamp jaw means releasably secured to said cable, said clamp jaw means including cam follower means for engaging said passive cam means during said retraction and automatically separating said clamp jaw means from said cable to release the clamp means during the retraction, and
   indicator receiving means including fabric means disposed along the path of said cable for receiving harmlessly said released clamp means at a relatively high release rate.

2. The apparatus of claim 1, wherein said clamp jaw means includes first and second jaws and means for urging said jaws in a cable clamp position, said follower means being positioned to separate and release said jaws from the cable when the follower means engages said cam means.

3. The apparatus of claim 2, wherein said cam means includes a concial member disposed about said cable, and said follower means includes a pair of members, one on each said jaw, forming a funnel-shaped follower for engaging said conical member.

4. The apparatus of claim 1, wherein said cable is secured to a winch assembly that pivots about a given axis, said cam means being pivotally mounted to pivot with said cable.

5. Apparatus for automatically disengaging an aerial warning indicator secured to a cable during the retraction of said cable comprising:
   passive cam means including a conical member disposed about said cable secured adjacent the earth in a relatively fixed spaced position with respect to said cable, and
   clamp means including said indicator and clamp jaw means releasably secured to said cable, said clamp jaw means including first and second jaw means for urging said jaws in a cable clamp position, and
   cam follower means for engaging said passive cam means during said retraction and automatically separating and releasing said jaws from the cable during the retraction, said follower means including a pair of members, one of each said jaw, forming a funnel-shaped follower for engaging said conical member.

6. Apparatus for automatically disengaging an aerial warning indicator secured to a cable during the retraction of said cable, said cable being secured to a winch assembly that pivots about a given axis, said apparatus comprising:
   passive cam means secured adjacent the earth in a relatively fixed spaced position with respect to said cable and pivotally mounted to pivot with said cable, and
   clamp means including said indicator and clamp jaw means releasably secured to said cable, said clamp jaw means including cam follower means for engaging said passive cam means during said retraction and automatically separating said clamp jaw means from said cable to release the clamp means during the retraction.

7. The apparatus of claim 6 further including indicator receiving means including fabric means disposed along the path of said cable for receiving harmlessly said released clamp means at a relatively high release rate.

* * * * *